UNITED STATES PATENT OFFICE.

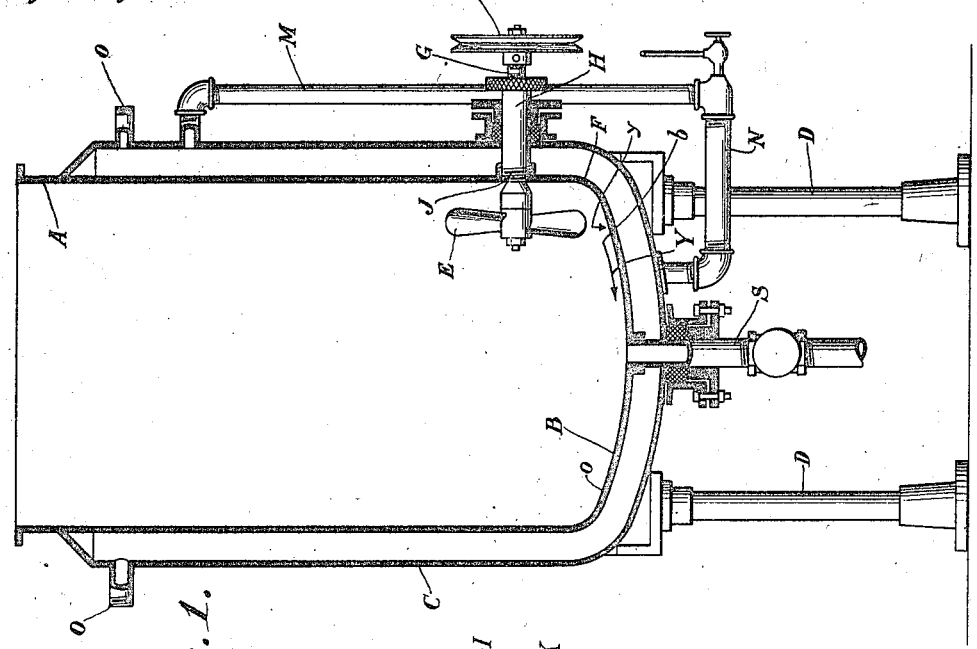
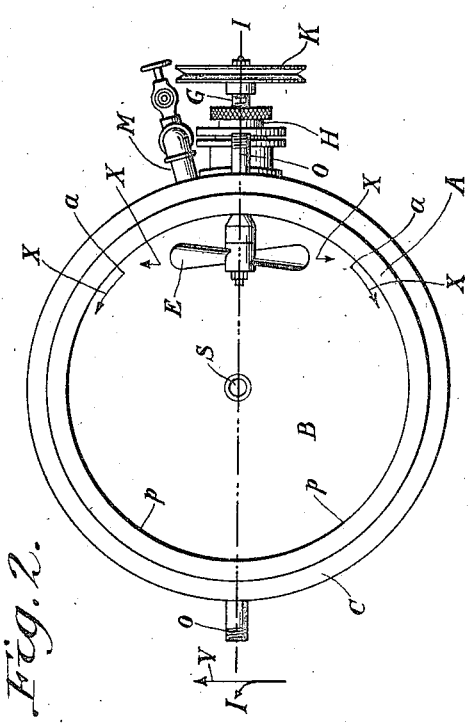

NIELS D. NIELSEN, OF ELYRIA, OHIO.

AGITATING MEANS.

1,268,602.     Specification of Letters Patent.     Patented June 4, 1918.

Original application filed September 25, 1916, Serial No. 122,017. Divided and this application filed January 9, 1918. Serial No. 210,974.

*To all whom it may concern:*

Be it known that I, NIELS D. NIELSEN, a citizen of the United States, residing at Elyria, in the county of Lorain and State of Ohio, have invented certain new and useful Improvements in Agitating Means; and I do hereby declare the following to be a full, clear, and exact description of the invention, such as will enable others skilled in the art to which it appertains to make and use the same.

My invention relates to improvements in apparatus for agitating the contents of such vessels as tanks, vats and the like.

One of the objects of my invention is to provide means which will more quickly, thoroughly, effectively and uniformly expose the contents of the tank to the heating or cooling effect of the walls of the containing vessel. It is highly desirable to realize these results by the use of cheap and convenient devices for that purpose. I aim to provide apparatus cheap to construct and cheap and convenient to operate.

It will be obvious also that my invention may be employed for other uses and realize other results.

These and other objects of my invention will be better understood from a description of an embodiment of the invention.

This application is a division of my application Serial No. 122,017, filed Sept. 25, 1916, and is companion to my application Serial No. 189,712, filed Sept. 4, 1917.

Figure 1 is a section taken upon a vertical plane passing through the central vertical axis of an embodiment of my invention.

Fig. 2 is a plan view of an embodiment of my invention.

Fig. 1 is taken along the line I—I of Fig. 2, looking in the direction of the arrow V.

Referring now to the drawing and to the embodiment of the invention illustrated therein, at A is shown a tank or vat which is here shown as cylindrical in form. The bottom wall B of the tank is inclined downwardly with respect to the ends of the side walls. I prefer to dish or incline the bottom of the tank downwardly, in all directions, from the juncture of the bottom with the side walls toward the center. The tank is jacketed, as shown at C and supported upon supporting means, such as columns D.

Agitating means, here shown as a propeller E, is mounted closely adjacent the juncture F of the side walls and bottom of the tank. The propeller E is mounted upon a shaft G, which passes through the side walls of the tank near the bottom thereof. In the embodiment shown, the shaft passes through a sleeve H, which is firmly secured in the side walls of the tank. In the embodiment shown, threads J are employed to connect the sleeve to the tank proper.

At K is shown a pulley, through which the propeller and shaft are rotated. When the propeller is mounted near the bottom of the tank, as illustrated in the drawing, effective agitation and distribution of the contents of the tank can be realized, even though such contents are greatly reduced, and where milk or cream are to be agitated or distributed, the apparatus can be employed, even though the contents of the tank are greatly reduced, without churning the same into butter.

When the propeller is operated, a portion of the contents of the tank is thrown out radially, or substantially radially, in the direction of the arrows $x$, $x$ and $y$. The fluid moving in the direction of the arrows $x$, $x$ will strike the portions of the side walls of the tank adjacent the points $a$, $a$. Where a curved tank, such as illustrated in the drawing, is employed, the closer the propeller is to the side walls of the tank, the greater the angle of deflection will be at the point where the fluid strikes the side walls. This fluid will be deflected by the side walls in the direction of the arrows $x$, $x$ toward the opposite walls of the tank. The fluid hurled in the direction of arrow $y$ will strike the portion of the bottom of the tank adjacent $b$, and will be deflected toward the opposite side, in the direction of the arrow $y$.

The device E will also drive a part of the liquid across the tank, striking the opposite side walls of the point $p$ and the bottom wall in the neighborhood of the point $o$. Of course, these parts being inclined, the liquid will be deflected. All these currents will cause a great agitation of the contents of the tank and a very thorough distribution of the liquid throughout the tank and exposure of the same to the cooling or heating effect of the walls of the tank. Pipes M, N and O are employed for supplying or withdrawing heating and cooling agencies from the jacket surrounding the tank, and a pipe S is employed for supplying to or withdrawing liquid from the tank itself.

It will be understood that any convenient means may be employed for supplying or withdrawing fluids from the tank or jacket, and that any convenient means may be employed for driving the device E. It will also be understood that many departures may be made from the form and details of the embodiment of my invention, without departing from the spirit thereof.

I claim:—

1. In a device of the class described, the combination of a tank provided with side walls and a bottom, a propeller in said tank on a shaft passing through a side wall of said tank near the junction of the bottom and such side wall, the side walls being inclined away and the bottom being inclined downwardly from said propeller, such walls and bottom adapted to deflect liquid hurled radially from said propeller thereagainst toward the portion of the walls of the tank opposite the propeller, the walls opposite the propeller being inclined back toward the propeller and adapted to cause liquid driven thereagainst by the propeller to return to the propeller.

2. In a device of the class described, the combination of a tank having closed side walls and a bottom, portions of said side walls being inclined away from a position adjacent the juncture of such side wall portions and the bottom, the bottom being inclined downwardly from such position when the tank is vertically arranged, and means at such position for hurling the liquid contents of the tank in a vertical or substantially vertical plane against inclined portions of such walls and said downwardly inclined portion of the bottom of the tank, and for driving contents of the tank against the portions of the walls opposite said means, which opposite side wall portions are inclined to deflect the liquid back toward said means.

3. In a device of the class described, the combination of a tank having side walls and a bottom, portions of said side walls being inclined away from a position adjacent the juncture of such side wall portions and the bottom wall, the bottom being inclined downwardly from such position when the tank is set vertically, a second portion of the bottom wall of the tank inclined upwardly toward the portions of the side walls opposite said position, and a propeller having blades substantially straight radially located at such position for hurling the liquid contents of the tank in a vertical or substantially vertical plane against such inclined portions of such walls and bottom of the tank, and for driving contents of said tank against the portions of the side walls opposite said position and said second portion of the bottom wall.

4. In a device of the class described, the combination of a cylindrical tank having a saucer-shaped bottom, a rotatable propeller shaft projecting through a side wall adjacent the bottom, a propeller mounted on said shaft close to the side wall and adapted when rotated to hurl liquid against curved portions of the tank's side and bottom walls adjacent the propeller, and to project other parts of the liquid against curved portions of the tank's side and bottom walls opposite said propeller, means through which said propeller shaft is operated.

5. In fluid agitating mechanism, the combination of a tank provided with cylindrical side walls and a saucer-shaped bottom, said side walls being provided with an opening through which a propeller shaft extends into said tank and terminates therein, said opening being near the junction of the bottom and side wall of the tank, a propeller on said shaft and adjacent the end thereof in said tank located near the junction of the bottom and side walls thereof, the side walls and bottom being inclined away from said propeller and adapted to deflect liquid hurled radially from said propeller thereagainst toward the portion of the walls of the tank opposite the propeller, the walls opposite the propeller being inclined back toward the propeller and adapted to cause liquid driven thereagainst by the propeller to return to the propeller, said propeller being located so low in said tank as to remain submerged as long as an appreciable amount of liquid remains therein, the blades of the propeller being substantially straight radially, a pulley or like device on the other end of the shaft through which the same is driven.

6. In a device of the class described, the combination of a tank having side walls and a bottom wall, portions of said side walls being inclined away from a position adjacent the junction of such side wall portions and the bottom wall, a propeller at such position for hurling the liquid contents of the tank in a vertical or substantially vertical plane against such inclined portions of such side walls and a bottom inclined upwardly opposite said propeller, said propeller driving contents of the tank against the portions of said side walls opposite the propeller and against the upwardly inclined bottom whence it is deflected upwardly against the side walls of the tank.

In witness whereof, I have hereunto signed my name this 24th day of December, 1917.

NIELS D. NIELSEN.